United States Patent [19]

Christensen et al.

[11] 3,888,883

[45] June 10, 1975

[54] PRODUCTION OF COUMARIN

[75] Inventors: Nils J. Christensen, Palatine; Ted Symon, Lombard, both of Ill.

[73] Assignee: Universal Oil Products Company, Des Plaines, Ill.

[22] Filed: Aug. 1, 1973

[21] Appl. No.: 384,762

[52] U.S. Cl. ................................. 260/343.2 R
[51] Int. Cl. .................................... C07d 7/28
[58] Field of Search ..................... 260/343.2 R

[56] References Cited
UNITED STATES PATENTS

| | | | |
|---|---|---|---|
| 2,789,995 | 4/1957 | Johnston | 260/343.2 X |
| 3,259,635 | 7/1966 | Ritter et al. | 260/343.2 |
| 3,322,794 | 5/1967 | Haeberli | 260/343.2 |
| 3,803,175 | 4/1974 | Sparks et al. | 260/343.2 |

*Primary Examiner*—John M. Ford
*Attorney, Agent, or Firm*—Raymond H. Nelson; William H. Page, II

[57] ABSTRACT

Coumarin is produced by the thermal cyclization of o-methyl coumarate in a continuous manner by treating said o-methyl coumarate at a temperature in the range of from about 200° to about 350° C. and a liquid hourly space velocity of from about 0.1 to about 3.0.

6 Claims, No Drawings

PRODUCTION OF COUMARIN

This invention relates to a process for the production of coumarin. More specifically, the invention is concerned with a process for the thermal cyclization of o-methyl coumarate at cyclization conditions hereinafter set forth in greater detail whereby the aforesaid o-methyl coumarate is converted to coumarin.

Coumarin, which is the desired product resulting from the process of the present invention, is an important chemical in the fragrance industry. Inasmuch as coumarin possesses a fragrant odor which is similar in nature to that of vanilla, it may be utilized as a deodorizing and odor enhancing agent in such varied products as cosmetic and toiletry articles such as perfumes, colognes, soaps, talcs, bath powders, etc., as well as being used in tobacco, inks, rubber and other products where aromatic ingredients are required. Coumarin may be prepared by the reaction or condensation of phenol with methylacrylate in a vinylation reaction which is effected in the presence of catalysts such as palladium acetylacetonate or palladium acetate or, if so desired, in the presence of a catalyst system comprising palladium acetylacetonate or palladium acetate, copper acetate and air. However, the products which result from this vinylation reaction will comprise, in addition to coumarin, o-methyl coumarate and p-methyl coumarate. In order to obtain a greater yield of the desired product, namely, coumarin, it is necessary to cyclize the o-methyl coumarate to form coumarin thereby enhancing the yield of the desired product.

It is therefore an object of this invention to provide a process for the cyclization of o-methyl coumarate.

A further object of this invention is to provide a process for the thermal cyclization of o-methyl coumarate at conditions hereinafter set forth in greater detail to form coumarin.

In one aspect an embodiment of this invention is found in a process for the production of coumarin which comprises treating o-methyl coumarate at cyclization conditions, and recovering the resultant coumarin.

A specific embodiment of this invention is found in a process for the production of coumarin which comprises treating o-methyl coumarate in a continuous manner at a temperature in the range of from about 200° to about 350° C. and a liquid hourly space velocity in the range of from about 0.1 to about 3.0 in the presence of glass beads, quartz, stainless steel or other inert packing agents and recovering the resultant coumarin.

Other objects and embodiments will be found in the following further detailed description of the present invention.

As hereinbefore set forth the present invention is concerned with a process for producing coumarin. The reaction is effected by treating o-methyl coumarate, the precursor of coumarin, resulting from the palladium or palladium plus copper catalyzed vinylation of phenol with methylacrylate. It has now been discovered that the o-methyl coumarate may be converted to coumarin with a high selectivity to coumarin and a high conversion of the o-methyl coumarate by effecting the reaction in a continuous manner under certain cyclization conditions hereinafter set forth in greater detail. While the conversion of o-methyl coumarate to coumarin may be effected in a thermal manner by passing said coumarate through a reactor comprising glass or metal and containing a refractory oxide such as glass in any desirable form, it is also contemplated within the scope of this invention that a metal of Group IB of the Periodic Table may also be present, thereby effecting the conversion of o-methyl coumarate to coumarin in a catalytic manner at lower contact temperatures. Thus, it is possible to utilize copper, gold or silver in metallic form or as salts as catalysts for the process of this invention.

The aforementioned cyclization conditions which are employed to effect the conversion of o-methyl coumarate to coumarin will include elevated temperatures in a range of from about 200° to about 350° C., and preferably in a range of from 280° to about 330° C. and a liquid hourly space velocity which will lie within a range of from about 0.1 to about 3.0, and preferably in a range of from about 0.6 to about 1.0. By utilizing the continuous type of process as compared to a batch type process, it is possible to minimize the formation of unwanted side products such as the formation of phenolic esters from acetic propionic propinoic acid, which are used as solvents, and o-methyl coumarate which may be formed during the batch type operation. Likewise another advantage of utilizing the continuous method of operation is that the percentage of conversion of o-methyl coumarate to coumarin is greatly enhanced, the percentage of conversion of o-methyl coumarate in a batch type operation is usually in a range of from about 15 to about 45% as contrasted to the percent conversion of o-methyl coumarate in a continuous type operation in which said conversion ranges from about 45 to about 100%.

The continuous process for the production of coumarin is usually effected by continuously charging the feed stock through a heated reactor which contains a packing such as glass in the form of chips, beads, etc., either alone or in combination with a catalyst comprising a metal of Group IB of the Periodic Table. As hereinbefore set forth, the feed stock is charged to the reactor which is maintained at a predetermined temperature within the range hereinbefore set forth at liquid hourly space velocities preferably ranging from about 0.6 to about 1.0. After passage through the heated reactor, the reactor effluent is continuously withdrawn and subjected to conventional means of separation whereby the desired coumarin is separated from any unreacted o-methyl coumarate and/or other compounds such as p-methyl coumarate which may also be present. In the preferred embodiment of the invention the feed stock is charged to the reactor as a solution in which the feed stock is dissolved in a solvent such as acetic acid, propionic acid, butyric acid, etc.

While the feed stock may comprise o-methyl coumarate per se, it is also contemplated within the scope of this invention that the feed stock may comprise a reaction mixture resulting from the vinylation of phenol with methylacrylate, said reaction mixture containing coumarin, o-methyl coumarate and p-methyl coumarate. In the event that the vinylation of phenol with methylacrylate has been effected utilizing a catalyst system consisting of a palladium compound plus a copper compound in the presence of air, it is contemplated that the vinylation reaction mixture when passing through the cyclization reactor will deposit out the copper which is present in the vinylation reaction mixture and therefore permit the thus deposited copper to act as a catalyst for the cyclization reaction, said copper forming on the solid support present or on the walls of the reactor. As in the prior discussion of the continuous method of operation, the reactor effluent is again continuously withdrawn and subjected to conventional menas of separation in order to recover the desired coumarin while any unreacted o-methyl coumarate may be recycled to form a portion of the feed stock.

As will hereinafter be shown in greater detail in the examples, by utilizing the continuous method of operation herein described, it will be possible to effect a high degree of conversion of o-methyl coumarate to coumarin with an approximately 100% selectivity in a relatively simple and economical manner.

The following examples are given to illustrate the process of this invention which examples, however, are not intended to limit the generally broad scope of the present invention in strict accordance therewith.

EXAMPLE I

In this example a glass tube packed with ¼ inch diameter glass beads was positioned in a jacketed furnace. The upper portion of the tube was equipped with a dropping funnel which was wrapped with electrical tape in order to maintain the feed stock comprising o-methyl coumarate in a fluid state while a condenser was positioned at the bottom of the tube to cool the reaction effluent. The tube was heated to a temperature of 280° C. while a solution consisting of 8.9 grams of o-methyl coumarate in 81 grams of propionic acid feed was charged to the reactor at a feed rate of approximately 30 cc. per hour (a liquid hourly space velocity of approximately 0.4). The reactor effluent was analyzed, the results showing a 62% conversion of the o-methyl coumarate and a selectivity to coumarin of 100%.

Two subsequent runs were used employing the identical equipment. However, the feed stock comprised a vinylation reaction mixture consisting of coumarin, o-methyl coumarate and p-methyl coumarate. The first run was made while maintaining the reactor at a temperature of 245° C., the feed stock being charged at a rate of 60 cc. per hour (a liquid hourly space velocity of approximately 0.8). The product showed a conversion of 36% of o-methyl coumarate and a coumarin selectivity of 100%. In the second run, the feed stock was again charged to the reactor at a liquid hourly space velocity of 0.8 while maintaining the temperature of the reactor at 285° C. At the end of 3 hours, there was an 80% conversion of the o-methyl coumarate with a 100% selectivity to coumarin.

EXAMPLE II

In this example a series of runs was made using an identical reactor. However, in place of the dropping funnel which was used in Example I the feed stock was metered into the reactor by means of a Lapp pump in order to accurately control the input of the feed stock. In addition, the reactor was equipped with an internal sliding thermocouple assembly in order that an accurate temperature profile in the reaction zone could be obtained. The feed stock which was employed in this experiment comprised a vinylation reaction effluent which was subjected to a heating treatment under nitrogen in order to precipitate any excess palladium present onto some added diatomaceous earth. This was accomplished by charging the filtered vinylation reaction effluent to a glass-lined, rotating autoclave containing the diatomaceous earth and heating the mixture to 130° C. under a pressure of 250 pounds per square inch of nitrogen for a period of 3 hours. The results of these continuous runs are set forth in Table I below:

TABLE I

| Reaction Temperature °C. | Reaction Time Hours | Feed Rate cc/hr | Conversion o-methyl coumarate % | Coumarin Selectivity % |
|---|---|---|---|---|
| 245 | 2.8 | 60 | 36 | 100 |
| 285 | 2.9 | 60 | 80 | 100 |
| 260 | 3.3 | 60 | 45 | 100 |
| 330 | 3.3 | 60 | 89 | 100 |
| 290 | 3.3 | 60 | 88 | 100 |
| 285 | 4.8 | 40 | 95 | 99 |
| 260 | 4.8 | 40 | 80 | 98 |

It will be noted from the above table that when utilizing temperatures ranging from about 285° to about 330° C. and a feed rate of 60 cc. per hour (a liquid hourly space velocity of approximately 0.8) in combination that a high conversion rate of o-methyl coumarate, that is, from about 80 to 89% with a 100% selectivity to coumarin, can be obtained.

EXAMPLE III

In this example an extended run was made utilizing a filtered vinylation reaction effluent which had been heated under a nitrogen atmosphere in the presence of added diatomaceous earth in a manner similar to that set forth in the above examples. The cyclization apparatus which was described in the above examples was again used, the temperature of the reactor being maintained in a range of from about 275° to about 295° C. with a feed rate of 63 cc. per hour for a duration of 44 hours. The results of this extended run are set forth in Table II below:

TABLE II

| Reaction Time Hours | Conversion o-methyl coumarate % | Coumarin Selectivity % |
|---|---|---|
| 4 | 82 | 100 |
| 6 | 82 | 100 |
| 12 | 91 | 99 |
| 22 | 91 | 105 |
| 32 | 90 | 99 |
| 38 | 91 | 100 |
| 44 | 91 | 100 |

It is thus evident that a high conversion of o-methyl coumarate, that is, from 82 to 91% and a 100% selectivity to coumarin, is thus obtained.

EXAMPLE IV

In this example the reactor which was utilized in the above examples was packed with glass beads and copper pellets in an intermingled fashion. The reactor was heated to a temperature of 250° C. and the feed stock comprising a vinylation reaction effluent was charged thereto at a liquid hourly space velocity of about 0.8. It was found upon analyzing the effluent from this reaction that an 82% conversion of o-methyl coumarate with a selectivity to coumarin of 96% was obtained thereby.

When the above experiment is repeated utilizing silver or gold in place of copper, similar results will be obtained thereby.

the following table the conversion of o-methyl coumarate to coumarin was difficult even while using extended reaction times. As is shown in the following table, a selectivity to coumarin of 100% was obtained. However, the conversion of o-methyl coumarate ranged from only 15 to 45%. In the following table HOPr designates propionic acid, HOAc designates acetic acid, KOAc is potassium acetate, NaOAc is sodium acetate, $CoCl_2$ is cobalt chloride, $Co_2O_3$ is cobalt oxide, and $KHSO_4$ is potassium hydrogen sulfate.

TABLE III

| Solvent Acid | Metal Salt | Millimoles Salt | Reaction Temperature °C. | Reaction Time Hours | o-Methyl coumarate % Conversion | Coumarin % Selectivity |
|---|---|---|---|---|---|---|
| HOAc | KOAc | 10 | 120 | 6 | 15 | 100 |
| HOPr | KOAc | 10 | 140 | 15 | 35 | 100 |
| HOPr | KOAc | 20 | 140 | 6.5 | 16 | 100 |
| HOPr | KOAc | 40 | 140 | 14 | 45 | 100 |
| HOAc | NaOAc | 10 | 120 | 6 | 15 | 100 |
| HOPr | NaOAc | 40 | 130 | 7 | 16 | 100 |
| HOPr | $CoCl_2$ | 5 | 140 | 6.5 | 15 | 100 |
| HOPr | $Co_2O_3$ | 5 | 140 | 7.5 | 20 | 100 |
| HOPr | $Co_2O_3$ | 12 | 140 | 7 | 20 | 100 |
| HOPr | $KHSO_4$ | 5 | 140 | 7 | 20 | 100 |

EXAMPLE V

To illustrate the superiority of utilizing a continuous cyclization method in place of a batch type cyclization reaction, a series of experiments were run. In the first experiment a vinylation reaction effluent was placed in a 1-liter stainless steel autoclave under 850 pounds per square inch of nitrogen pressure at a temperature of 225° C. At the end of a ½-hour reaction time, there was a 100% conversion of o-methyl coumarate but only an 80% conversion to coumarin. When the above experiment was repeated at 180°C. under the same conditions for a period of 6 hours, there was an 88% conversion of o-methyl coumarate but only a 90% selectivity to coumarin.

A high degree of conversion of o-methyl coumarate and a relatively high degree of selectivity to coumarin was obtained by the additional steps of vacuum stripping the low boiling materials plus phenol from a filtered vinylation reaction effluent followed by distillation of the coumarin, o-methyl coumarate and p-methyl coumarate fraction followed by heating of the fraction at 240° C. under a pressure of 260 mm of mercury for 1 hour. There was a 100% conversion of o-methyl coumarate and a 94% selectivity to coumarin. However, it is to be noted that this conversion and selectivity were obtained only after subjecting the vinylation reaction effluent to the additional steps of vacuum stripping and distillation, these steps increasing the cost of the desired product in contrast to the simple continuous cyclization reaction which was illustrated in the above examples.

EXAMPLE VI

In this example various attempts were made using metal salts in order to achieve the cyclization of o-methyl coumarate to coumarin, said runs being made at reflux temperatures using either acetic acid or propionic acid as the reaction solvent. As will be shown in It is evident from the above table that when utilizing a batch type operation, the attempt to achieve cyclization of o-methyl coumarate to coumarin at the reflux temperatures in the presence of a metal salt is ineffective from a commercial standpoint inasmuch as the percentage of o-methyl coumarate to coumarin ranges from a low of 15% to a high of 45%. Therefore such a product would be economically unfeasible to operate, in contradistinction to the continuous cyclization reaction employing a packing such as glass or a metal selected from Group IB of the Periodic Table in the reaction zone, the continuous cyclization reaction being run at elevated temperatures ranging from about 200° to about 350° C. and preferably in a range of from about 280° to about 330° C. and a liquid hourly space velocity of from about 0.1 to about 3.0, whereby the o-methyl coumarate will be cyclized to coumarin at a conversion rate greater than 80% to the corresponding selectivity of coumarin of 100%.

We claim as our invention:

1. A process for the production of coumarin which comprises continuously passing o-methyl coumarate through a reaction zone containing a refractory oxide packing at cyclization conditions including a temperature in the range of from about 200° to about 350° C. and a liquid hourly space velocity of from about 0.1 to about 3.0, and recovering the resultant coumarin.

2. The process as set forth in claim 1 in which said refractory oxide packing comprises glass beads.

3. The process as set forth in claim 1 further characterized in that said packing contains a metal of Group IB of the Periodic Table.

4. The process as set forth in claim 3 in which said metal of Group IB of the Periodic Table is copper.

5. The process as set forth in claim 3 in which said metal of Group IB of the Periodic Table is gold.

6. The process as set forth in claim 3 in which said metal of Group IB of the Periodic Table is silver.

* * * * *